(12) United States Patent
Bedetti

(10) Patent No.: US 7,955,566 B2
(45) Date of Patent: Jun. 7, 2011

(54) FLUID BED GRANULATOR

(75) Inventor: Gianfranco Bedetti, Milan (IT)

(73) Assignee: Urea Casale S.A. (CH)

( * ) Notice: Subject to any disclaimer, the term of this patent is extended or adjusted under 35 U.S.C. 154(b) by 874 days.

(21) Appl. No.: 11/939,915

(22) Filed: Nov. 14, 2007

(65) Prior Publication Data

US 2008/0124256 A1    May 29, 2008

Related U.S. Application Data

(62) Division of application No. 10/472,618, filed as application No. PCT/EP02/03113 on Mar. 20, 2002, now Pat. No. 7,438,729.

(30) Foreign Application Priority Data

Mar. 21, 2001   (EP) ..................... 01107028

(51) Int. Cl.
*B01J 8/18* (2006.01)
(52) U.S. Cl. ...................................... 422/139; 422/143
(58) Field of Classification Search .................. 422/139, 422/143; 23/301, 313 R, 313 FB
See application file for complete search history.

(56) References Cited

U.S. PATENT DOCUMENTS

| | | | |
|---|---|---|---|
| 3,834,927 A | 9/1974 | Putney | |
| 3,903,839 A | 9/1975 | Rowe et al. | |
| 4,071,304 A | 1/1978 | Chauvin et al. | |
| 4,353,730 A | 10/1982 | Kinno et al. | |
| 5,695,701 A | 12/1997 | Funder et al. | |

FOREIGN PATENT DOCUMENTS

| | | |
|---|---|---|
| DE | 1 621 836 A | 6/1971 |
| DE | 1 792 206 A | 11/1971 |
| DE | 195 14 187 C1 | 5/1996 |
| SU | 1095979 A1 | 6/1984 |
| SU | 1169725 A1 | 7/1985 |
| SU | 1604456 A1 | 11/1990 |
| SU | 1813554 A1 | 5/1993 |
| WO | WO-01/43861 A1 | 6/2001 |

*Primary Examiner* — Edward M Johnson
(74) *Attorney, Agent, or Firm* — Akerman Senterfitt

(57) ABSTRACT

In order to produce granules granulometrically polidispersed in a very little range, a fluid bed granulation process of the type comprising the steps of preparing a fluid bed of seeds (S1) of the substance to be granulated, having a free surface (P) substantially horizontal; and feeding a continuous flow (L) of a fluid comprising a growth liquid, provides in the fluid bed for a continuous vortex (V) with a substantially horizontal axis, in which an upper zone (Z1) of seeds wetting and evaporation of possible solvent contained in the flow (L) and a lower zone (Z2) of solidification/consolidation of the growth liquid are identified.

6 Claims, 3 Drawing Sheets

FLUID BED GRANULATOR

CROSS-REFERENCE TO RELATED APPLICATIONS

This application is a divisional of U.S. patent application Ser. No. 10/472,618 filed Sep. 19, 2003, which is a §371 National Phase of PCT/EP02/03113, filed Mar. 20, 2002, the entirety of which is incorporated herein by reference.

FIELD OF APPLICATION

In its most general aspect the present invention relates to a fluid bed granulation process of a suitable substance like, for example (not limiting), urea, ammonium nitrate, ammonium chloride and other similar substances susceptible to be granulated.

Particularly, this invention concerns a fluid bed granulation process, where granules of a chosen substance are obtained through continuous growth (of both volume and mass) of granule's seeds of that substance, continually fed in said fluid bed, simultaneously with a flow of a suitable growth substance in the liquid state.

In the following description and attached claims, the expression: "granule's seed of a chosen substance" is generally meant to indicate particles of the substance to be granulated being equal or less than about 1.5 mm in diameter. Furthermore, to simplify, the term "seeds" will be used to indicate the granule's seeds.

The growth substance is of the same nature of the substance to be granulated and is in liquid state, suited to wet, stick and solidify on the seeds and on the growing granules which, together, form said fluid bed.

This invention refers also to a granulation apparatus, suitable to carry out the aforesaid process.

PRIOR ART

It's known that to reach a good granulation outcome (prearranged granule's dimension, shape and mass) with a fluid bed process of the above type, a good "wetting" of both the seeds and the growing granules by the growth liquid is required. And, to this end, the growth liquid must be fed to the fluid bed in the form of the least possible droplets, certainly less than the seeds and the growing granules, which said droplets are to get in touch with. For example, as for the urea this allows the evaporation of water contained in the growth liquid (solution of urea), so as to obtain a high purity final product (granules). Usually, the growth liquid's droplets size is crucial to allow the evaporation of the solvent that may be inside said growth liquid.

At most, said growth liquid should be fed in the so-called "atomized" form. Only in this condition, actually, the growth liquid is able to get in touch one by one with all the seeds or granules suspended in the fluid bed, and to wet evenly and in an optimal way the whole surface thereof.

In order to atomize the growth liquid, the prior art makes use of specific nozzles fed with said liquid and with big volumes of air (or other suitable gas) having high speed, for example comprised between 150 m/s and 300 m/s.

After being wetted, the seeds and the growing granules are submitted to an evaporation step of the solvent that may be inside said growth liquid and then to a solidification/consolidation step.

A process of this kind, for the urea production, is for example described in U.S. Pat. No. 4,353,730.

Even though largely used and also advantageous under different points of view, the prior art's fluid bed granulation processes have recognized drawbacks not overcome until now. Among such drawbacks, the most important ones include the substantial inability to control the final product granulometry between predetermined values, and the elevated operating costs. In fact, in order to obtain the small droplets of the growth liquid, required for the granulation process, one must work with big volumes of air (or other gas) having high speed, which on the other hand prevent the granules' growth control inside the fluid bed and thus the granulometry of the final product.

Furthermore, the first drawback involves classification and screening operations of the produced granules, the always considerable waste of granules of unacceptable size (too big or too little), the recovery operations of such waste and its recycle upstream to the granulation process.

SUMMARY OF THE INVENTION

The problem underlying the present invention is to devise and to make available a fluid bed granulation process having functional characteristics such that all the cited drawbacks linked to the prior art would be overcome.

The idea of solution for such problem is to make it happen cyclically, for each granule, in the same fluid bed, all the above mentioned steps of granules formation and growth, for a predeterminable number of cycles depending on the desired dimensions of the final granules, by controlling the execution time of each operational cycle.

On the basis of such idea, the above technical problem is solved by a granulation process according to the invention, having the functional characteristics specified in the subsequent claims.

The advantages and the characteristics of the invention will be better shown from the description of an illustrative and non limiting embodiment of a granulation process according to the invention, made hereinafter with reference to the enclosed drawings.

SHORT DESCRIPTION OF THE DRAWINGS

DETAILED DESCRIPTION

Figure 1:
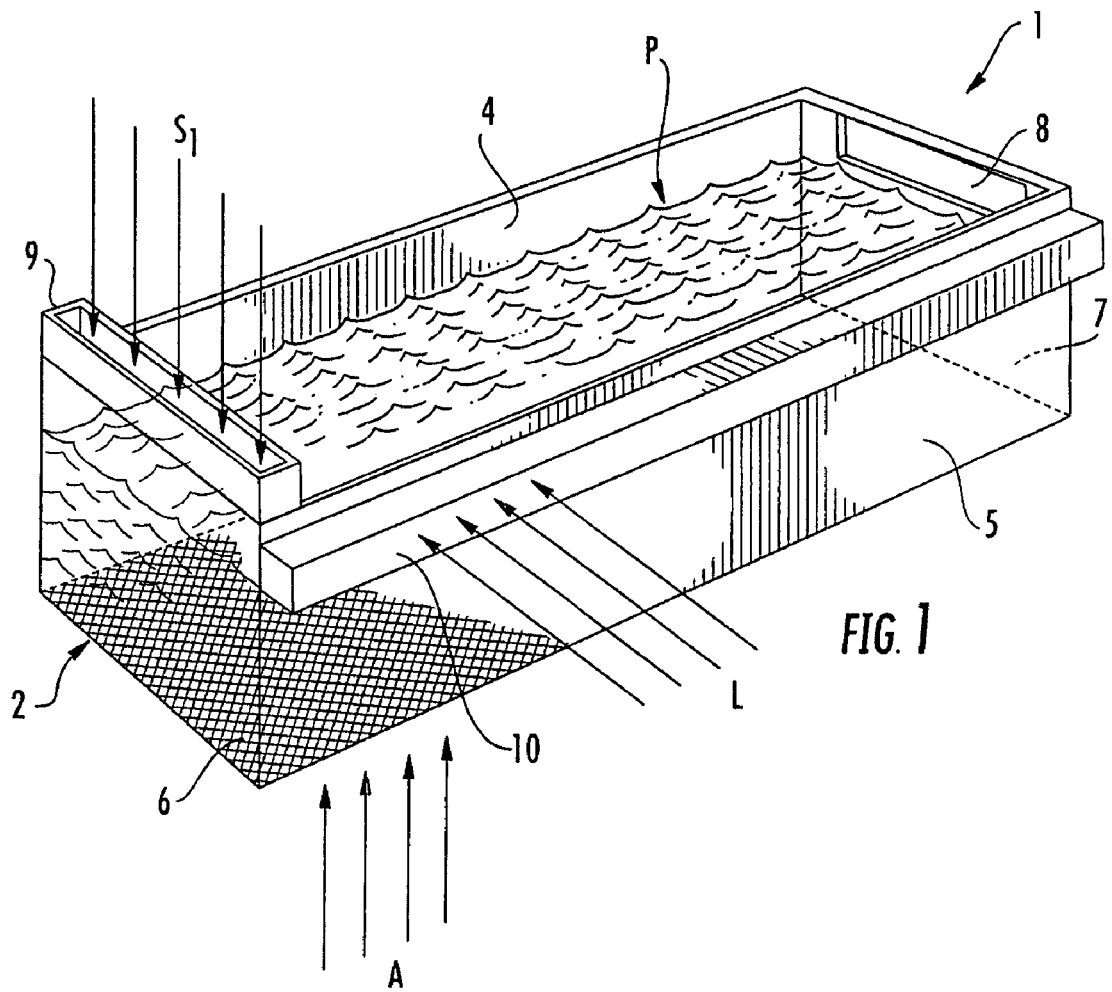
FIG. 1 shows prospettically and schematically an apparatus (granulator) for the implementation of the granulation process of the present invention.
Figure 2:
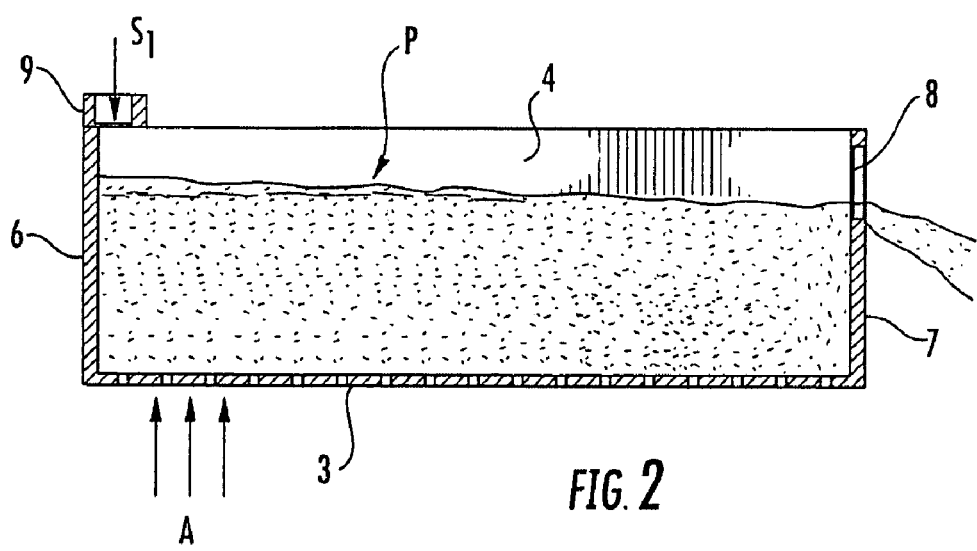
FIGS. 2 and 3 show the granulator of FIG. 1 in longitudinal transversal section, respectively.
Figure 3:
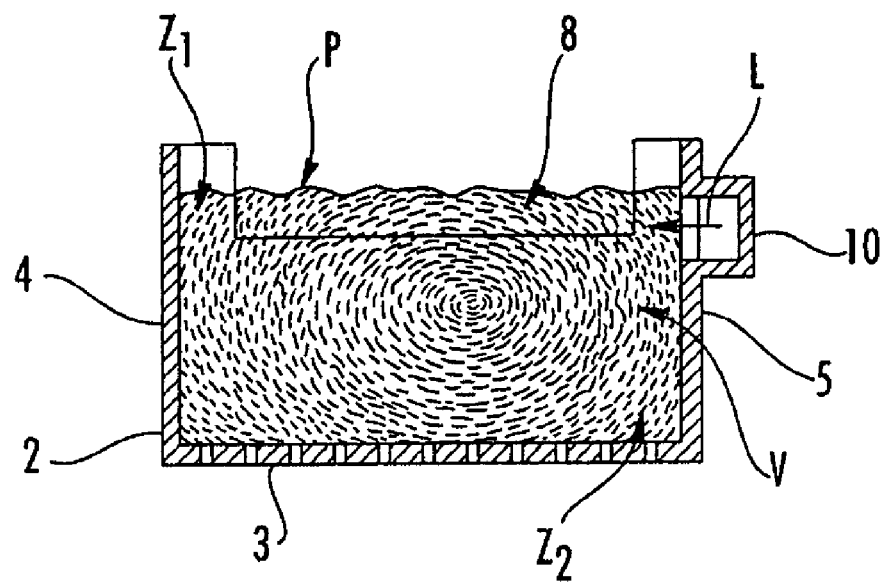

With reference to FIGS. 1, 2 and 3, a fluid bed granulator according to the present invention, indicated as a whole with 1, comprises a container 2, represented open at the top, of substantially parallelepiped shape, of rectangular section, in which a fluid bed is intended to be obtained, as will result from the prosecution of the description.

Said container 2 has a bottom 3, permeable to gas, for example made up of a perforated element, situated between two long opposite side walls 4, 5 and two short opposite side walls 6, 7. In the rest of the description, the short side wall 6 is also called: head wall of granulator 1, whereas the opposite wall 7 is also called: discharge wall of the (granulated) final product. This because the wall 7 is provided with a discharge opening 8 for the final granules; said discharge opening 8 is essentially a weir, and is preferably extended to all the width of wall 7 and to a height on bottom 3, predetermined according to the thickness of the fluid bed to be obtained in said container 2.

At the upper side of the head wall 6 a device is supported, schematically represented with 9, per se conventional and therefore not described in detail, for the uniform feeding of a continuous flow of seeds $S_1$, inside the container 2 along said wall 6.

Near the upper end of the long side wall 5, a distributor-supplier 10 is supported with conventional but not represented means, in order to feed such container 2, of a fluid flow L comprising a selected growth liquid. Said distributor 10 extends substantially for all the length of wall 5 and at a prearranged height from the bottom 3, according to the fluid bed's thickness obtained in said container 2. In particular, the distributor 10 is set at a height over the bottom 3 slightly less than the height of the free surface P of the fluid bed obtained in the container 2.

The granulator 1 of the present invention comprises, in a position below the container 2, a blowing system (not represented, as it is conventional) of air A or other gaseous fluid, provided in order to create and maintain a fluid bed of granules inside the container 2.

With reference to the apparatus above schematically described (FIG. 1 to 3), an example of implementation of the granulation process of the present invention is now illustrated.

In steady state conditions, a fluid bed of seeds $S_1$ of the selected substance to be granulated and of growing granules, in container 2, is fed continuously through the distributor 9 at the head wall 6. Such fluid bed is obtained, supported and maintained, by means of an appropriate continuous flow of air A, fed from below and continuously inside the container 2, through its perforated bottom 3, on which it is evenly distributed. For this reason said air A is also called fluidification air.

The thickness of the fluid bed is so that it's free surface reaches the level of said opening 8 and a continuous discharge of granules occurs outside the container 2. Such continuous discharge, counterbalanced by the continuous feeding of seeds $S_1$ determines in the fluid bed a kind of "fluid vein", flowing from head wall 6 towards the opposite wall 7 or, better, towards its discharge opening 8. In this same direction, the free surface P is visibly tilted down.

According to this configuration, the seeds S1 are located only near the head of the granulator 1 (wall 6), while in the remaining part of the fluid bed are present the growing granules.

It should further be noted that the fluidification air A, blown from below into the container 2, crosses the fluid bed and carries out a thermal exchange with the growing granules that form such fluid bed (for the reasons that will be described hereinbelow), heating itself progressively. Indeed, the fluidification air A removes the solidification heat of a growth fluid fed onto the seeds $S_1$ and onto the growing granules, as will be described afterwards in the description.

Therefore, in steady state conditions, superimposed layers with an increasing temperature from the bottom (bottom 3) towards the top (free surface P) may be roughly identified in the fluid bed (zones Z1 and Z2).

At the upper layer (zone Z1), which comprises the free surface P of the fluid bed, but below it, that is at the hotter layer of the fluid bed, a continuous (hot) fluid flow L is introduced into the container 2. Such flow comprises essentially air and a selected atomized growth liquid. This flow L, supplied by the distributor 10 substantially on all the length of the wall 5 with predetermined flow rate and momentum flux (momentum), is oriented crosswise to the above mentioned "fluid vein". In this way it pushes the upper layer of the fluid bed in a substantially parallel direction to its free surface P, forming and supporting in the fluid bed a continuous vortex V with a substantially horizontal axis, as represented in FIG. 3. The vortex V is circumscribed between walls 4-7 and the bottom 3 of the container 2.

The individual seeds $S_1$ of the substance to be granulated, currently located in the upper hot layer of the fluid bed (zone Z1), are hit (wetted) many times with the particles of atomized growth liquid of flow L, with evaporation of the solvent that may be inside said growth liquid. The individual seeds $S_1$ are furthermore stressed and pushed towards the opposite wall 4 of the container 2 by the vortex caused by the flow L. Thanks to the existence of vortex V, the individual seeds $S_1$, "wetted", deflect naturally towards the bottom 3 of the container 2 (zone Z2), when they reach the proximity of wall 4.

In the course towards bottom 3, the individual wetted seeds $S_1$ leave the upper hot layer of the fluid bed (zone Z1) in order to cross the lower layers (zone Z2), progressively colder. During this course the growth liquid's solidification/consolidation step is carried out on the seed's surface. This step is completed during the course of the individual seeds $S_1$, pushed by the above-mentioned vortex V towards the wall 5, obtaining a respective granule, with volume and mass slightly superior to the ones of the corresponding seed S1. The individual granules thus formed, deflect near the wall 5 towards the upper hot layer of the fluid bed (Z1), always pushed by the vortex V.

Once the upper hot layer (Z1) is reached, the individual granules come into contact with the atomized growth liquid, from which they are pushed towards the wall 4. These granules substantially repeat the course described above for the seeds S1, from which they originated, and on them the same steps of wetting/evaporation and solidification/consolidation are repeated with consequent further volume and mass growth.

As seen, the impact of flow L on the seeds S1 and on the growing granules determines inside the fluid bed an "overall" shift in the form of a vortex V that rotates around his horizontal axis at a speed which depends on the momentum of flow L. Inside the vortex, the seeds S1 and the growing granules are anyhow always in the state of turbulence typical of a fluid bed.

One must furthermore note that for the constant stress of the force of gravity on the fluid bed, said seeds and said growing granules move towards the weir discharge opening, which is to say in the direction of the axis of said vortex, this last develops in helical manner, with a pitch strictly related to the longitudinal shift speed of the above-mentioned "fluid vein" and to the momentum of the flow L.

With the reduction of the helical vortex pitch grows the number of times that the growing granules repeat (cyclically) the steps of wetting/evaporation and solidification/consolidation inside the fluid bed, that is to say that the rate of growth increases. So, adjusting the helical vortex pitch it is possible to produce and to discharge continuously granules of predetermined dimensions from the weir opening 8.

It should be noted that, according to this embodiment of the invention, the produced granules are granulometrically polidispersed in a very little range, for example with variations of only +/−20% as regards the granulometric medium value, thus obtaining a product directly marketable. In the prior art processes, such variations are over the +/−100%. This means that, for instance in the case of urea production, about 40% of the granules leaving the granulation process (after cooling)

have to be recovered and further treated as indicated above at the end of the prior art section.

This is advantageously made possible thanks to the fact that every individual seed S1 and every growing granule undergo substantially a same growing process, because fore every seed and for every granule it is possible to control the time of execution of every cycle and the number of cycles to be effected inside the fluid bed. In other words, the "history" of every particle inside the fluid bed is fundamentally the same thanks to the diffusion phenomena (shifts caused by diffusion) to which undergo the particles inside a fluid bed.

Figure 4:
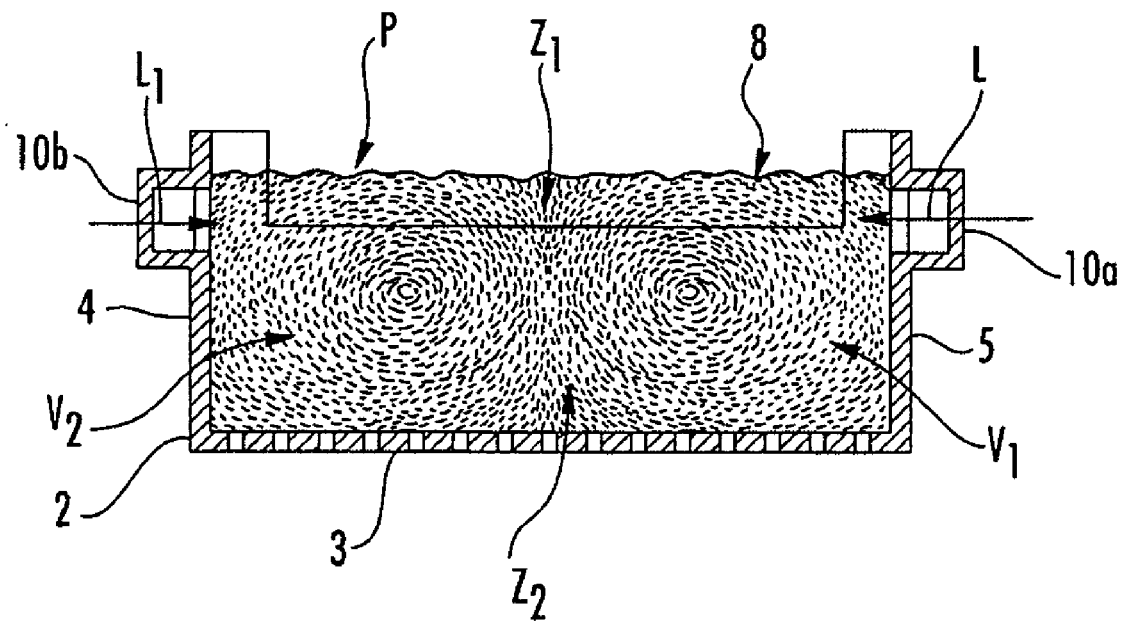
FIG. 4 shows an alternative embodiment of the granulator of FIG. 1 in transversal section.

With reference to FIG. 4, the granulation process according to the present invention is implemented obtaining in the fluid bed, made of seeds S1 and growing granules, two opposite helical vortex V1 and V2, of the type described above. To this aim, the container 2 is provided, on both opposite long side walls 4, 5, with respective distributors 10a, 10b for supplying flows L, L1 comprising air and a same growth liquid.

In this figure, the features of granulator 1, structurally and functionally equivalent to those illustrated in the preceding figures will be referred to with the same reference numbers and will not be described any further.

So doing, it is possible to double the production yield of the granulator suitable to carry out the granulation process of the invention, while keeping constant the operating conditions of the fluid bed and the pressure drop of the fluidification and cooling air flow A. Moreover, the existence of two opposite vortex generated by respective flows L, L1 makes it possible that, during the wetting step, the individual seeds S1 and growing granules are pushed towards the central part of the fluid bed. Thus avoiding that once wetted they hit the long side walls 4, 5, sticking thereto, and therefore forming on such walls undesired deposit.

In accordance with a further embodiment of the invention, the granulating process is conceived in order to obtain a substantial "cylindrical" vortex in the fluid bed comprising seeds S1 and growing granules. This is carried out always using a continuous flow L of a fluid (comprising an atomized growth liquid) fed substantially parallel to the free surface P of said liquid flow, at the hot upper zone thereof.

Figure 5:
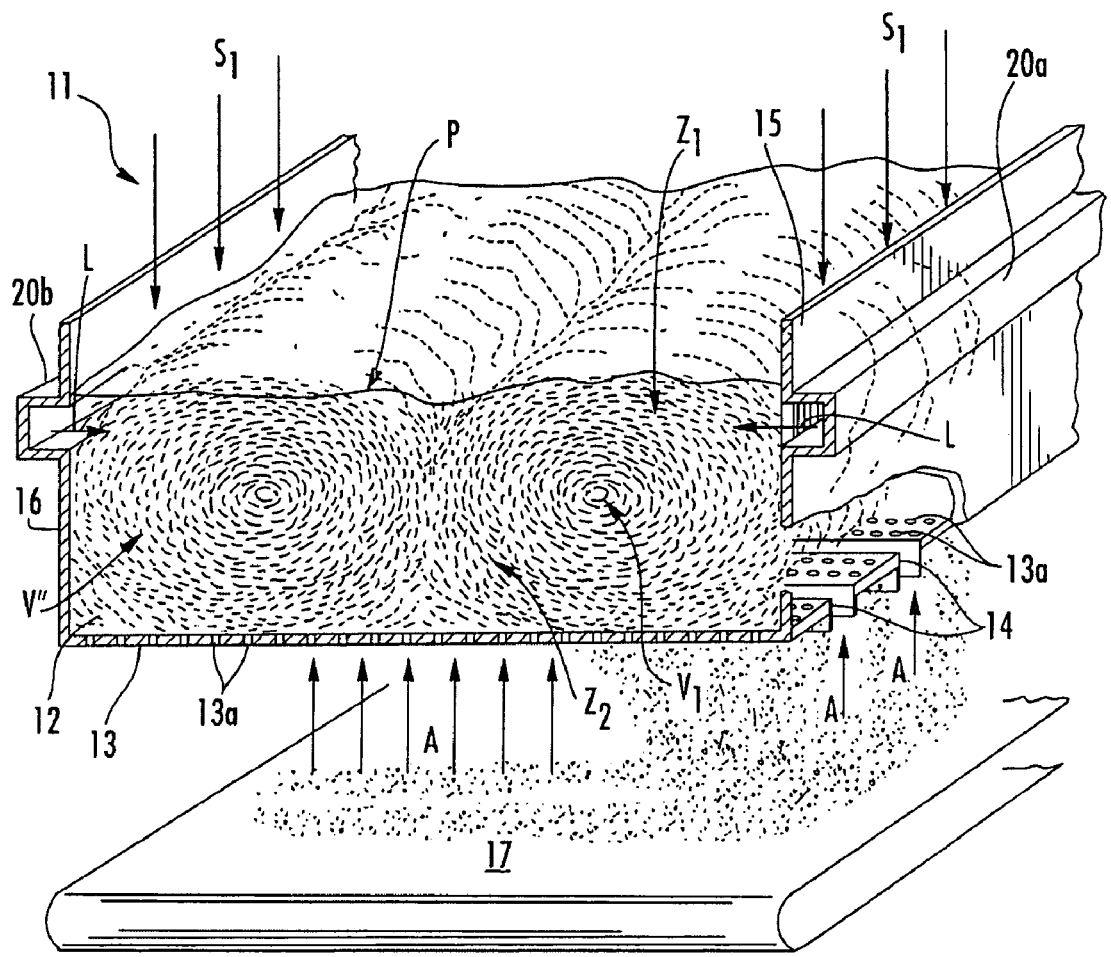
FIG. 5 shows prospettically and schematically a further embodiment of a granulator for the implementation of the process according to the invention.

To this aim, the granulator of the present invention is made according to the embodiment of FIG. 5. In particular, said granulator 11 comprises a container 12, of substantially parallelepiped shape, represented open at the top, which has a perforated bottom 13 with holes 13a and a plurality of slits 14. The slits 14 are suitably dimensioned and have a width correlated with (larger than) the diameter of the granules that one intends to produce.

In a position below the container 12, a blowing system, not represented as it is conventional, is provided for feeding in the container 12 itself a continuous flow of fluidification and cooling air A, through said holes 13a and slits 14.

The holes and the slits 14 are dimensioned in a way that the flow of air A that cross them with a predetermined flow rate, has within the fluid bed and above said holes 13a the desired fluidification velocity. At the same time, the flow of air A has within the slits 14 a velocity higher than the fluidification velocity but such as not to be able to hold up granules having diameter and weight equal to those that one intends to produce.

The long side walls 15, 16 of said container 12 support respective suppliers 20a, 20b in a position corresponding to the hot upper layer (zone Z1) of the fluid bed obtained in the container 12, nearby its free surface P but below it. Said suppliers feed in said upper layer, equal and opposite flows L of a same fluid comprising air and a growth liquid, thus causing in said fluid bed the generation of opposite, substantial cylindrical, vortex V' and V".

The short front and back side walls of the container 12, as well as the seed S1 feeding device, are not shown in FIG. 5 for a better understanding of the represented granulator. However, with respect to the short side walls, it should be understood that these are full, without any granule discharge opening. In this way, the seeds and the growing granules circulating within the cylindrical vortex V' and V" are not subjected to a longitudinal displacement along the vortex axis. Moreover, with respect to the seed feeding device, this can be provided parallel to the side walls 15 and 16 and, preferably, in proximity (supported) thereto, one for each side, so as to distribute the seeds S1 uniformly and along the entire length of the fluid bed.

The seeds S1 and the growing granules pushed in said vortex V' and V" are subjected, cyclically, to the steps of wetting by the atomized growth liquid, evaporation of possible solvent contained in the growth liquid, and solidification/consolidation of the so obtained granule. And said cycles are repeated automatically till the granules reach dimensions and weight such as the fluidification air A that flow through the slits 14 is no more able to further support them. Thus these granules "fall down" by gravity through said slits 14, outside the bottom 13, where they are collected, for instance on a moving belt 17, for finally being discharged to the external of the granulator 11.

It has to be noted that the air A that cross the slits 14 is also called classification air, because of its function of "classifying" the granules that have dimensions and weight equal to those that one intends to produce, selecting them among all the seeds S1 and growing granules contained in the fluid bed.

It has further to be noted that when the flow of classification air A penetrates in the zone of the fluid bed above the slits 14, it causes a local dispersion (thinning) of the particles therein located (seeds S1 and growing granules), thus allowing the discharge of the granules of desired dimension and weight, by gravity, from the bottom 13 through the slits 14. According to this alternative embodiment of the granulation process of the invention, it is possible to further reduce the very little range of granulometric polidispersion of the final product, till, even to obtain a final product of substantially monodispersed granulometry.

The invention thus conceived may be susceptible to variations and modifications, all falling within the scope of protection defined in the following claims.

For instance, the slits 14 of the granulator 11 of FIG. 5 can be arranged on the bottom 13 also in transversal (oblique) or parallel direction with respect to the long side walls 15, 16. Preferably, such slits 14 are arranged in proximity of said side walls 15, 16 and parallel thereto.

The granulator 11 of FIG. 5, can also be manufactured with a single supplier 20a or 20b of flow L. In this case, a single cylindrical vortex is obtained.

In the alternative, it is also possible to conceive a granulator of the type shown in FIG. 5, comprising a plurality of containers 12, superimposed one above the other. In this case, the granules discharged from the bottom 13 of a container 12 fall down on the fluid bed contained in the underlying container 12 for a further growth in dimensions and weight. The collecting means, such as the moving belt 17, being provided below the lowermost container 12, only. The different classification between a container and the other is obtained by varying in a corresponding way the width of slits 14 or the velocity of the classification air.

In general, the container 12 of granulator 11 of FIG. 5 can alternatively be fed—with suitable means—from distinct flows of fluidification air and classification air, respectively. The first flow is made to penetrate in the fluid bed through the holes 13a of the bottom 13, while the second one through the slits 14.

The flow L described above can comprise an atomized growth liquid relatively diluted in a solvent, For instance, in the case of urea granule production, the atomized growth liquid can contain molten urea at 94%-96% (weight percent), with the remaining 6-4% of water (solvent). Alternatively, flow L can substantially contain the growth liquid only, which is thus fed in the fluid bed in the form of continues full liquid blade or jet. In this case, always in the example of urea granule production, the concentration of molten urea (growth liquid) can be greater than 98%.

Furthermore, particularly satisfactorily results for vortex formation have been obtained feeding the flow L comprising the growth liquid, in the fluid bed, at a velocity comprised between 2 and 50 m/s, preferably between 10 and 20 m/s. In case of an atomized growth liquid, said fluid bed inlet velocity has been advantageously obtained by opportunely slowing down—for instance by means of a venturi—the velocity of the air and atomized growth liquid jet spouted from an atomizer nozzle of conventional type.

Among the further advantages that can be obtained thanks to the granulation process of the invention, it is worth citing also a substantial reduction in undesired dust formation, due—among others—to a premature cooling of the atomized growth fluid, if compared to the prior art processes. It is thus obtained a reduction if not even the elimination of the equipment required for recovering such dust. Together with the possibility of obtaining a final product of suitable granulometry, i.e. directly marketable, this advantage allow to substantially reduce the investment and maintenance costs, as well as the energy consumption, of the corresponding granulating plant.

The invention claimed is:

1. Fluid bed granulator comprising a container of substantially parallelepiped shape, of rectangular section, in which a fluid bed is generated, the container having a bottom permeable to a fluidification flow of air or other suitable gas, defined between two opposite long side walls and two opposite short side walls, the latter being a head wall and a discharge wall of final granulate, respectively, the granulator being characterized in that at least one of said long wide walls is provided with a respective distributor-supplier for feeding in said fluid bed a fluid flow comprising a growth liquid.

2. Granulator according to claim 1, characterized by the fact that said distributor-supplier is arranged at each of said long side walls.

3. Fluid bed granulator comprising a container of substantially parallelepiped shape, in which a fluid bed is generated, the container having a bottom permeable to a fluidification flow of air or other suitable gas, defined between opposite side walls, said granulator being characterized in that at least one of said side walls is provided with a respective distributor-supplier for feeding in said fluid bed a fluid flow comprising a growth liquid, and by the fact of further comprising at least one slit, of width correlated to the diameter of the granules intended to be produced, defined in said bottom for discharging granules from the container, and means for feeding a classification flow of air or other suitable gas in said fluid bed through said at least one slit.

4. Granulator according to claim 3, characterized by the fact that said means for feeding the classification flow of air or other suitable gas in said fluid bed corresponds to means for feeding in the fluid bed a fluidification flow.

5. Granulator according to claim 1, characterized by the fact that said distributor-supplier is supported at a predetermined height from said bottom.

6. Granulator according to claim 3, characterized by the fact that said distributor-supplier is supported at a predetermined height from said bottom.

* * * * *